(12) United States Patent
Askew

(10) Patent No.: US 9,880,647 B2
(45) Date of Patent: Jan. 30, 2018

(54) CAPACITIVE STYLUS WITH CLIP

(71) Applicant: Emission Monitoring Service, Inc., Baytown, TX (US)

(72) Inventor: Israel A. Askew, Baytown, TX (US)

(73) Assignee: EMISSION MONITORING SERVICE, INC., Baytown, TX (US)

( * ) Notice: Subject to any disclaimer, the term of this patent is extended or adjusted under 35 U.S.C. 154(b) by 36 days.

(21) Appl. No.: 15/068,147

(22) Filed: Mar. 11, 2016

(65) Prior Publication Data

US 2017/0262085 A1    Sep. 14, 2017

(51) Int. Cl.
G06F 3/033    (2013.01)
G06F 3/0354    (2013.01)
G06F 3/044    (2006.01)

(52) U.S. Cl.
CPC .......... G06F 3/03545 (2013.01); G06F 3/044 (2013.01)

(58) Field of Classification Search
CPC ......... G06F 3/03545; G06F 2203/0331; G06F 19/26; G06F 3/0233; G06F 1/163; G06F 3/016; G06F 3/017; G06F 3/0231; G06F 3/04886
See application file for complete search history.

(56) References Cited

U.S. PATENT DOCUMENTS

| | | | |
|---|---|---|---|
| 6,225,988 B1 * | 5/2001 | Robb | G06F 3/039 345/173 |
| 6,249,277 B1 | 6/2001 | Varveris | |
| 6,533,480 B2 | 3/2003 | Schneider | |
| 6,669,388 B1 * | 12/2003 | Short | B43K 23/012 401/7 |
| 8,730,194 B2 | 5/2014 | Vellanki | |
| 2004/0046734 A1 | 3/2004 | Hart | |
| 2004/0237261 A1 * | 12/2004 | Rouse | B43K 23/012 24/10 R |
| 2005/0057493 A1 | 3/2005 | Chun | |
| 2005/0062730 A1 | 3/2005 | Birecki | |
| 2006/0226184 A1 | 10/2006 | Karzmer | |

(Continued)

FOREIGN PATENT DOCUMENTS

FR    2939608 A1 *    6/2010    ............. G06F 3/014

OTHER PUBLICATIONS

Pyramex GLC100 (https://www.pyramexsafety.com/us_en/products/pyramex-industrial/gloves/glove-clip/glc100/, 2015 Pyramex Safety Products.*

(Continued)

*Primary Examiner* — Yuzhen Shen
(74) *Attorney, Agent, or Firm* — Norton Rose Fulbright US LLP

(57) ABSTRACT

A stylus device for capacitive-based touch screens may include a hook or other attachment device that allows the stylus to attach to a user's glove, or another piece of a garment to reduce the likelihood of the stylus being lost. Such a stylus may be easily accessed by the user to provide input on a capacitive-based touch screen without removing the glove or other garment, such that work disruptions by the capacitive-based touch screen are reduced or minimized. For example, the stylus may have a hook sized to attach to a glove finger, in which the stylus can be quickly accessed with a twist of the wrist and then allowed to hang from the glove when the stylus is not in use, such as when a worker is operating equipment.

11 Claims, 6 Drawing Sheets

(56) References Cited

U.S. PATENT DOCUMENTS

| | | |
|---|---|---|
| 2007/0216664 A1 | 9/2007 | Marye |
| 2008/0210724 A1* | 9/2008 | Geis .................... G06F 3/03545 |
| | | 224/217 |
| 2008/0297490 A1 | 12/2008 | Adkins |
| 2008/0297491 A1 | 12/2008 | Adkins |
| 2009/0278818 A1 | 11/2009 | DiNozzi et al. |
| 2009/0323267 A1* | 12/2009 | Besko ................ A61B 5/14552 |
| | | 361/679.4 |
| 2010/0188326 A1* | 7/2010 | Dines ..................... G06F 3/014 |
| | | 345/156 |
| 2011/0012870 A1 | 1/2011 | Pena |
| 2012/0170962 A1 | 7/2012 | Nwapa-Jourdan et al. |
| 2012/0242618 A1 | 9/2012 | Everest et al. |
| 2015/0022503 A1 | 1/2015 | Chang et al. |
| 2015/0277593 A1 | 10/2015 | Martin |
| 2016/0209934 A1* | 7/2016 | Yano ......................... G06F 3/03 |
| 2016/0239083 A1* | 8/2016 | Cheng ..................... G06F 3/014 |

OTHER PUBLICATIONS

Glove Guard, www.gloveguard.com, 2000.

\* cited by examiner

CAPACITIVE STYLUS WITH CLIP

FIELD OF THE DISCLOSURE

The instant disclosure relates to capacitive styluses for electronic devices. More specifically, portions of this disclosure relate to improving accessibility of capacitive styluses in working environments.

BACKGROUND

As electronic devices increase in availability and decrease in price, electronic devices have found an increasing number of applications where workflows can be improved. For example, medical personnel have begun carrying electronic devices and using them to log medicines, treatments, conditions, etc. By electronically documenting information, treatment protocols are much easier to enforce and patient outcomes are improved. Likewise, workers in commercial and industrial environments have also begun carrying electronic devices. The devices can be used to log conditions of and maintenance performed on various equipment, and thus efficiency improved and downtime of equipment reduced by enforcing compliance with maintenance protocols.

Electronic devices have improved in receiving input from users, such as medical personnel and maintenance personnel. Initially, electronic devices included keyboards for receiving input from users. Keyboard are cumbersome input devices because they restrict input to characters and numbers. Further, keyboards take up significant space on an electronic device because fifty or more discrete keys must be fit in a small amount of space. These keys then become so small that they are difficult for an operator to enter input without making errors and needing to backspace and re-enter input. Later, electronic devices began incorporating touch screens that allowed users to enter input by tapping on the display screen of the electronic device. Early touch screens implemented resistive touch screens, in which the touch screen registers user input by detecting changes in resistance in the vicinity of the user's finger in a layer near the screen. Although the details of operation of such a resistance-based touch screen are unnecessary to describe, it can be noted that resistance-based touch screen work with any object that makes contact with the screen, including user fingers when gloves are being worn and conventional writing implements such as pens and pencils. This is one benefit of resistance-based touch screens, however accuracy and resolution are limited with these screens.

Recently, touch screens are transitioning from the resistance-based touch screens to capacitive-based touch screens. These touch screens detect changes in capacitance in layers across the display screen to detect user input. Again the details of operation of such a capacitance-based touch screen are unnecessary to describe, but it can be noted that capacitive-based touch screens can only detect user input when conductive items contact the touch screen. Thus, although human fingers are conductive enough to activate the touch screen, when gloves are worn over the fingers a user is no longer able to interact with the capacitive-based touch screen. Many people work in environments in which gloves are necessary. For example, some users work outdoors in cold climates where gloves are necessary to protect fingers from the elements. As another example, some users work in industrial environments involving high voltages or other hazards where gloves are necessary to protect fingers from these hazards.

Styluses are sold that provide users with the ability to interact with capacitive-based touch screens. Many such styluses are made in the shape of pencils and pens to provide a natural writing experience for the user. However, these styluses are frequently lost because they are difficult to keep track of, particularly in busy working environments and industrial environments.

SUMMARY

A stylus device for capacitive-based touch screens may include a hook or other attachment device that allows the stylus to attach to a user's glove, or another piece of a garment to reduce the likelihood of the stylus being lost. Such a stylus may be easily accessed by the user to provide input on a capacitive-based touch screen without removing the glove or other garment, such that work disruptions by the capacitive-based touch screen are reduced or minimized. In one embodiment, the stylus is designed with a hook sized to attach to a glove finger, in which the stylus can be quickly accessed with a twist of the wrist and then allowed to hang from the glove when the stylus is not in use, such as when a worker is operating equipment. The device enables the user to reach or touch a much larger area of screen than would be possible with their thumb alone and without the aid of their other hand, such that the user can employ their other hand for other operations, such as to operate another tool or to hold a railing for support. The stylus device may be made of conductive materials and designed so as to create adequate surface contact around the thumb outside the protective material to allow the capacitive stylus to work while user is wearing a glove. Although stylus tips for capacitive-based touch screens are described throughout the application, the stylus tip may also be configured for use with resistive-based touch screens or other touch screens.

According to one embodiment, an apparatus may include a capacitive tip, a handle coupled to the capacitive tip, and/or a clip coupled to the handle, wherein the clip is configured to open based on force applied to the handle and return to a closed state upon removal of the applied force to the handle to open the clip.

According to another embodiment, an apparatus may include means for writing on a capacitive-based touch screen and/or means for attaching the writing means to a garment.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

In one embodiment, a stylus with clip may include a reverse-action clip that remains closed without any applied force and opens with applied force. Such a reverse-action clip may be advantageous in a working environment because the clip, once attached to a glove finger, remains attached to the glove finger until force is intentionally applied to the clip to remove the stylus from the glove finger. Thus, the stylus is not easily dropped or otherwise lost. Such a stylus with clip is shown in the various view of FIG. 1, FIG. 2, FIG. 3, FIG. 4, and FIG. 5.

Figure 1:
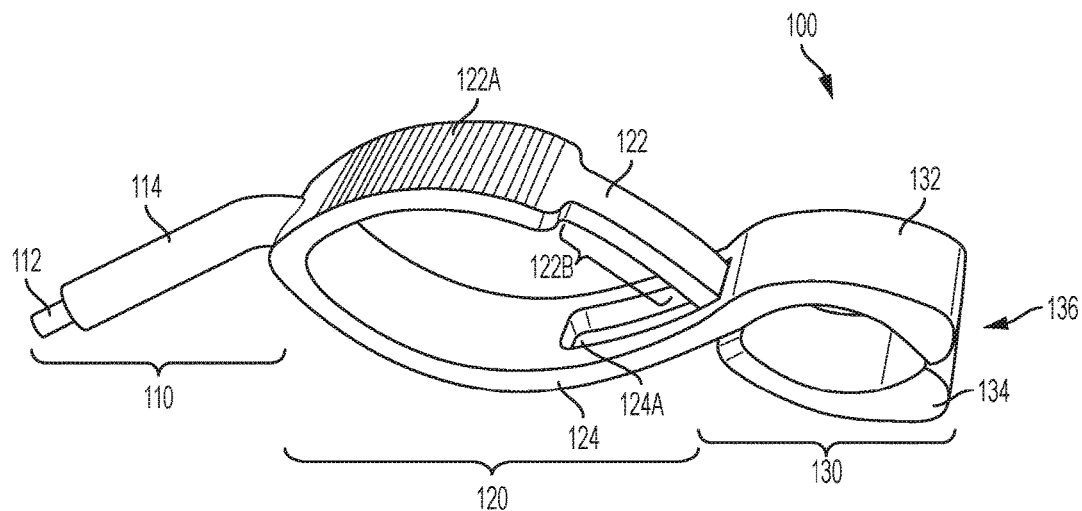
FIG. 1 is a perspective view of a stylus with clip according to one embodiment of the disclosure.
Figure 2:
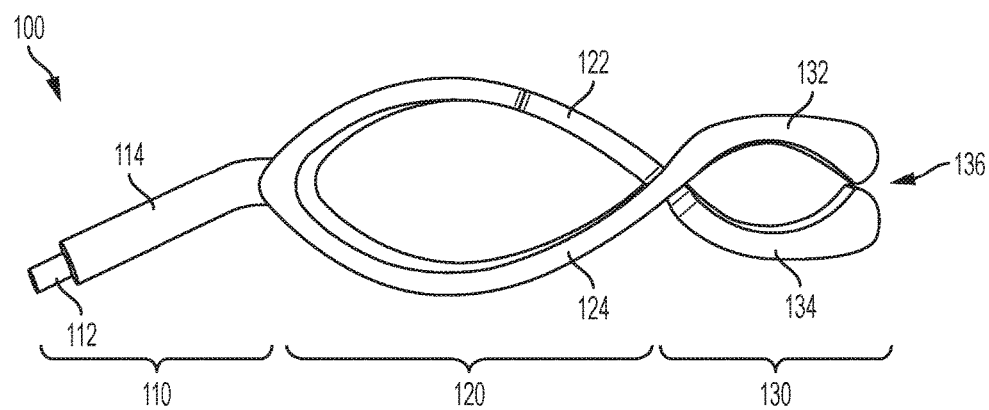
FIG. 2 is a side view of a stylus with clip according to one embodiment of the disclosure.
Figure 3:
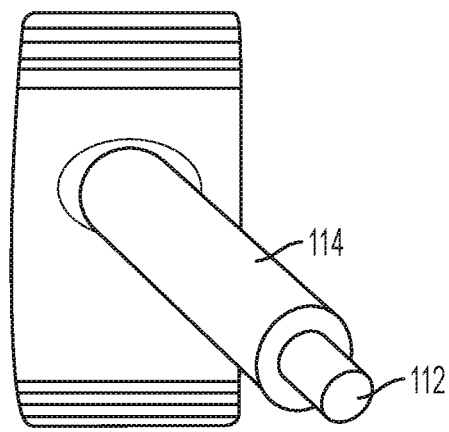
FIG. 3 is an end view of a stylus with clip showing the capacitive tip according to one embodiment of the disclosure.
Figure 4:
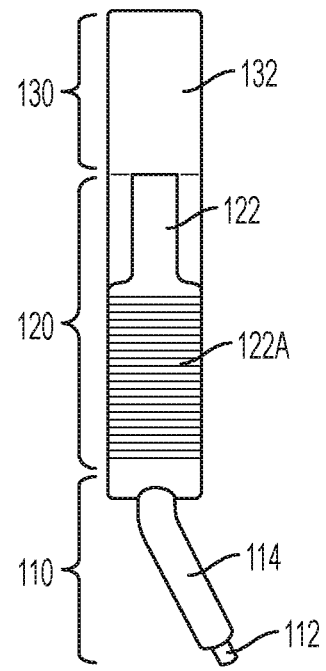
FIG. 4 is a top view of a stylus with clip according to one embodiment of the disclosure.

Although a particular clip is shown and sized to fit a glove finger, other clips or attachment mechanisms may be employed with the stylus or sized to fit other garments, such as a shirt sleeve or belt. FIG. 1 is a perspective view of a stylus with clip according to one embodiment of the disclosure; FIG. 2 is a side view of a stylus with clip according to one embodiment of the disclosure; FIG. 3 is an end view of a stylus with clip showing the capacitive tip according to one embodiment of the disclosure; and FIG. 4 is a top view of a stylus with clip according to one embodiment of the disclosure. In one embodiment, an apparatus 100 shown in FIGS. 1-4 may have a length of approximately 1.5 inches to 3 inches, and a tip and extension portion may have a length of approximately 0.25 to 1 inch.

An apparatus 100 may have three sections: a first section 110 for a stylus tip, a second section 120 for a handle, and a third section 130 for an attachment mechanism, such as a clip. The first section 110 may include a capacitive-compatible tip 112 attached at a distal end of an extension 114. The capacitive-compatible tip 112 may include a material that is sufficiently conductive to operate a capacitive-based touch screen, either in one or more layers of the tip 112 or as part of a composite material in the tip 112. For example, the tip 112 may include a conductive rubber tip. As other examples, the tip 112 may include a metal base or a conductive plastic. The extension 114 may be sized to allow easy operation of a capacitive-based touch screen when the apparatus 100 is attached to a finger glove. The second section 120 may include two handles 122 and 124. In one embodiment, the handles 122 and 124 may be a single piece and include a grip on the handles 122 and 124 illustrated on handle 122 and grip 122A. The grip 122A may include ribbings that improve handling of the apparatus 100, which may be particularly useful when a user is wearing thick gloves that reduce accessibility. The handles 122 and 124 may be part of pieces that extend into the third section 130 as clip portions 132 and 134. The clip portions 132 and 134 meet at a distal end of the apparatus 100 from the capacitive-compatible tip 112. At that distal end is a contact point 136. The contact point 136 and/or clip portions 132 and 134 may include interlocking teeth, ribbings, and/or other features that improve attachment of the apparatus 100 to glove fingers or other garments.

Operation of the apparatus 100 is performed by gripping the handles 122 and 124. When force is applied to the handles 122 and 124 to squeeze together the handles 122 and 124, a sliding segment 122B of the handle 122 moves through an opening 124A in the handle 124 along the length of the groove 124. At the same time, space between the clip portions 132 and 134 is increased and the third portion 130 is opened to allow attachment of the apparatus 100 to a garment, such as a glove finger. When force applied to the handles 122 and 124 is reduced, the handles 122 and 124 expand and the clip portions 132 and 134 close to attach the apparatus 100 to the garment.

Figure 5:
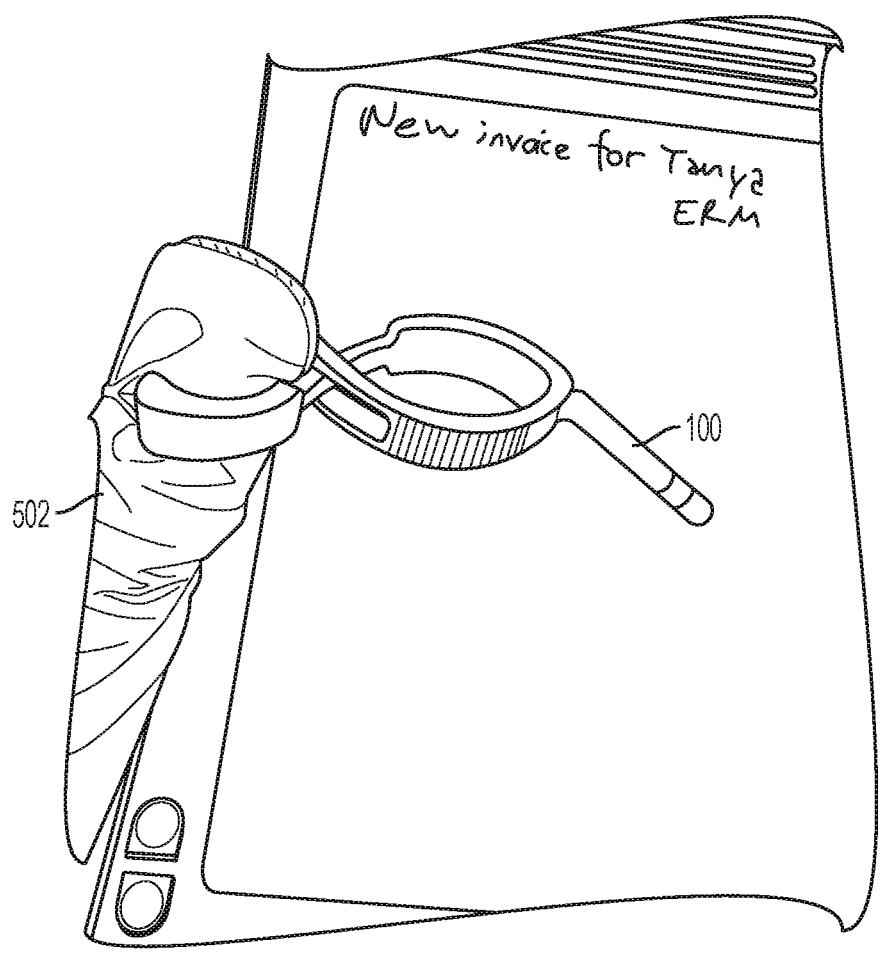
FIG. 5 is an illustration showing a stylus with clip attached to a glove finger and in use on a capacitive-based touch screen according to one embodiment of the disclosure.

The apparatus 100 of FIG. 1 is shown in use in FIG. 5. FIG. 5 is an illustration showing a stylus with clip attached to a glove finger and in use on a capacitive-based touch screen according to one embodiment of the disclosure. The stylus 100 may attach to glove finger 502 and remain attached until removed by a user applying force to the handles. A user may move glove finger 502 to make specific contact of the stylus tip to a capacitive-based touch screen to provide user input to a mobile device. Movement of the finger in the glove may be translated to movement of the stylus tip through the apparatus 100 when attached to the glove finger 502.

Figure 6:
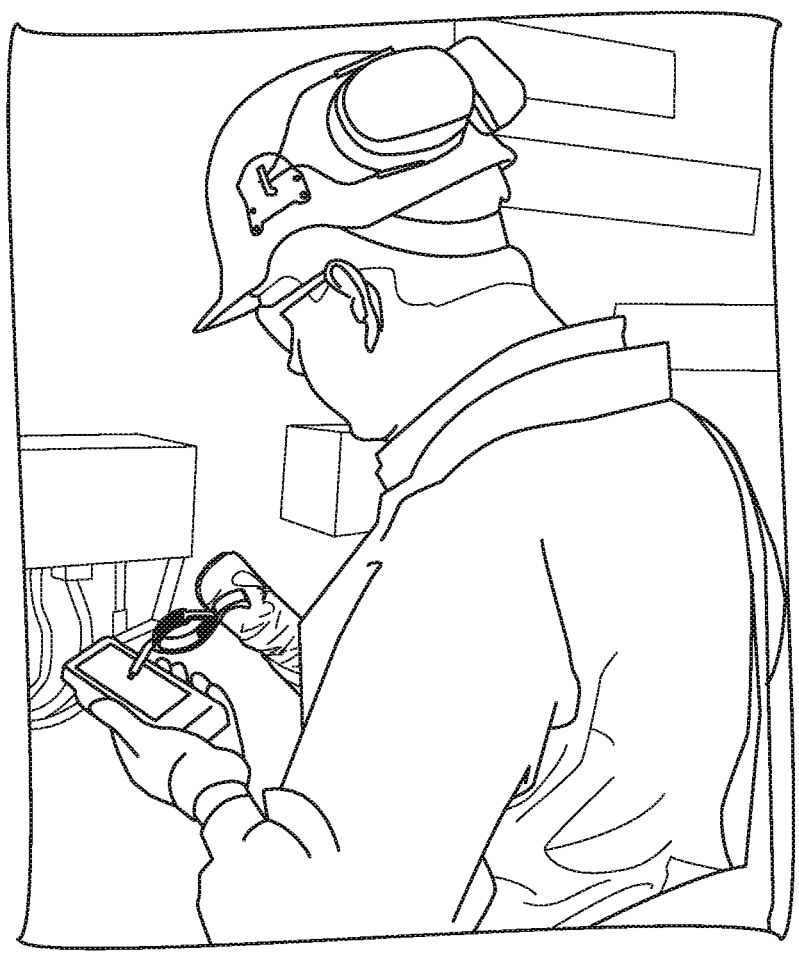
FIG. 6 is an illustration showing a stylus with clip in use in an environment requiring a worker to wear gloves according to one embodiment of the disclosure.

A stylus with clip as shown in the embodiment of FIG. 1, FIG. 2, FIG. 3, FIG. 4, and FIG. 5 may be used in work environments where workers do not have easy access to the mobile device, such as due to accessibility issues from wearing thick gloves. Such gloves may be worn, for example, by those in the electrical, environmental, chemical, or other fields. FIG. 6 is an illustration showing a stylus with clip in use in an environment requiring a worker to wear gloves according to one embodiment of the disclosure.

Figure 7:
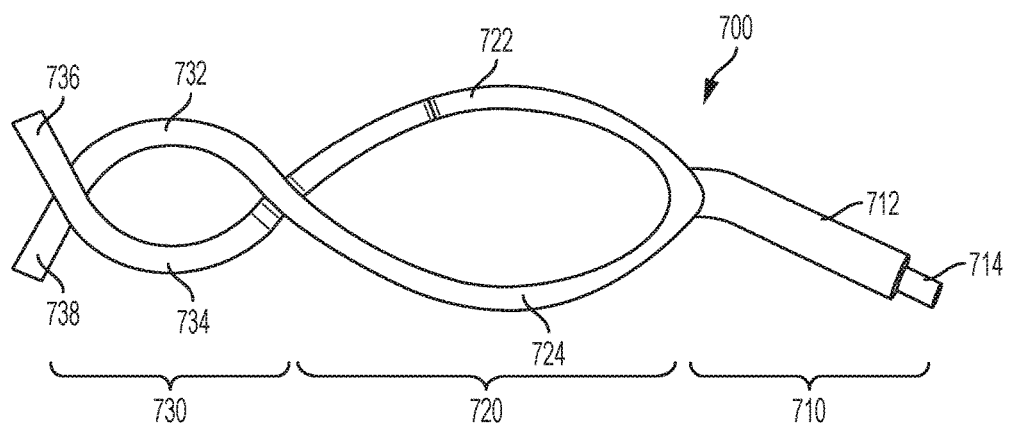
FIG. 7 is a side view of a stylus with clip according to another embodiment of the disclosure.

The attachment mechanism for a stylus with clip may differ from that shown in the embodiment of FIGS. 1-5. For example, instead of an open end 136 for attaching the apparatus 100 to a glove finger, a closed end may be used to allow a glove finger to be inserted through a ring of the stylus as shown in FIG. 7. FIG. 7 is a side view of a stylus with clip according to another embodiment of the disclosure. An apparatus 700 may include a first portion 710, a second portion 720, and a third portion 730. The first portion 710 may include a capacitive-compatible tip 712 attached at a distal end of an extension 714. The second portion 720 may include handles 722 and 724. The third portion 730 may include a first segment 732 and a second segment 734. The segments 734 and 732 extend to end portions 736 and 738, respectively. The segments 732 and 734 of the third portion 730 may form a closed ring that can expand or contract in diameter by applying force to end portions 736 and 738. When a pinching force is applied to end portions 736 and 738 to push the end portions 736 and 738 towards each other, the ring formed by segments 732 and 734 expands, after which the ring may be placed over a glove finger. As the applied force is decreased on end portions 736 and 738, the space between the segments 732 and 734 contracts to attach the apparatus 700 to the inserted glove finger. Other portions of the apparatus 700 may be similar to the apparatus 100 of FIGS. 1-5.

Figure 8:
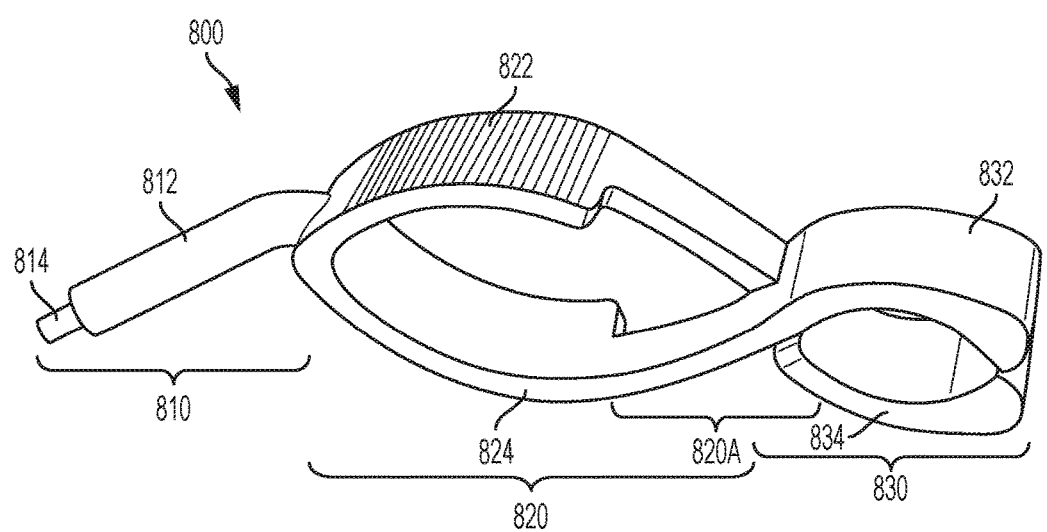
FIG. 8 is a side view of a stylus with clip according to a further embodiment of the disclosure.

As another example of a configuration for the apparatus, FIG. 8 illustrates a stylus with clip with a different actuating mechanism. FIG. 8 is a side view of a stylus with clip according to a further embodiment of the disclosure. An apparatus 800 includes a different sliding configuration for actuation of clip portions 832 and 834 of third section 830. In particular, handles 822 and 824 of second section 820 each reduce in size to about half of their largest width in portion 820A of second section 820. The two halves of the handles 822 and 824 slide along each other, although not necessarily in contact, when force is applied to handles 822 and 824 to open the clip portions 832 and 834. The apparatus 800 also includes tip 814 and extension 812. The tip 814 may be a capacitive-compatible tip, but may also be resistive-compatible just as the above embodiments may also be resistive-compatible.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a capacitive tip;
   a handle coupled to the capacitive tip, wherein a first segment of the handle comprises a slim portion, wherein a second segment of the handle comprises an opening, and wherein the slim portion slides through the opening upon the application of force to the handle; and
   a clip coupled to the handle,
   wherein the clip is configured to open based on force applied to the handle and return to a closed state upon removal of the applied force to the handle to open the clip, and
   wherein the clip in the closed state is configured to close at a contact point to attach to another object.

2. The apparatus of claim 1, wherein the capacitive tip, the handle, and the clip are a single piece.

3. The apparatus of claim 1, wherein capacitive tip comprises a conductive rubber tip and is configured to be compatible with capacitive-based touch screens.

4. The apparatus of claim 1, wherein the clip is configured to couple to a finger glove.

5. The apparatus of claim 1, wherein an entirety of the body of the apparatus is configured to be compatible with capacitive touch screens.

6. An apparatus, comprising:
   means for writing on a capacitive-based touch screen; and
   means for attaching the writing means to a garment, wherein the attaching means comprises a handle and a clip coupled to the handle, wherein a first segment of the handle comprises a slim portion, wherein a second segment of the handle comprises an opening, and wherein the slim portion slides through the opening upon the application of force to the handle,
   wherein the clip is configured to open based on force applied to the handle and return to a closed state upon removal of the applied force to the handle to open the clip, and wherein the clip in the closed state is configured to close at a contact point to attach to the garment.

7. The apparatus of claim 6, wherein the writing means and the attaching means are a single piece.

8. The apparatus of claim 6, wherein the attaching means comprises means for converting an applied force to a force for releasing the attaching means from the garment.

9. The apparatus of claim 6, wherein the writing means comprises a conductive rubber tip.

10. The apparatus of claim 6, wherein the attaching means is configured to attach to a glove finger.

11. The apparatus of claim 6, wherein the means for writing and the means for attaching are both configured to be compatible with capacitive touch screens.

* * * * *